United States Patent [19]

Geisler et al.

[11] Patent Number: 5,358,982
[45] Date of Patent: Oct. 25, 1994

[54] CROSSLINKED POLYMER MICROPARTICLES BASED ON EPOXY RESIN, THEIR PREPARATION AND THEIR USE

[75] Inventors: Joerg-Peter Geisler, Ingelheim; Stefan Petri, Taunusstein, both of Fed. Rep. of Germany

[73] Assignee: Hoechst Aktiengesellschaft AG, Fed. Rep. of Germany

[21] Appl. No.: 101,909

[22] Filed: Aug. 4, 1993

[30] Foreign Application Priority Data

Aug. 6, 1992 [DE] Fed. Rep. of Germany ........ 4225999

[51] Int. Cl.$^5$ .............................................. C08L 63/02
[52] U.S. Cl. .................................... 523/414; 523/417; 523/420
[58] Field of Search ................... 523/414, 417, 420

[56] References Cited

U.S. PATENT DOCUMENTS 5,135,970  8/1992  Honel et al. ..................... 523/414

Primary Examiner—Melvyn I. Marquis
Assistant Examiner—D. Aylward
Attorney, Agent, or Firm—Bierman and Muserlian

[57] ABSTRACT

Crosslinked polymer microparticles based on epoxy resin obtained by polymerization of aqueous dispersions (A) of compounds containing epoxide groups in the presence of up to 0.2 mol, preferably 0.02 to 0.15 mol (based on the nitrogen contained in (B)) of a nitrogen-containing organic compound (B) per epoxide equivalent and subsequent isolation which are preferably in the form of aqueous dispersions thereof, and are suitable as organic fillers, pigments, matting agents and/or reinforcing agents for binder systems and individual components thereof, paint formulations, coating and molding compositions, intermediate coatings, adhesives and the like, preferably based on water.

12 Claims, No Drawings

CROSSLINKED POLYMER MICROPARTICLES BASED ON EPOXY RESIN, THEIR PREPARATION AND THEIR USE

Flocculation-stable, aqueous dispersions of crosslinked polymer microparticles (also called microgels below) which are prepared by reaction of compounds (a) containing epoxide groups with polyamines (b), the functionality of (a) being greater than one, preferably 2–10, and in particular 2–3, and the statistical average of the functionality of (b) being two or greater than two, are known from EP-A 0 421 238. The compounds (a) containing epoxide groups are preferably employed here in the form of flocculation-stable, aqueous dispersions, and the reaction of (a) and (b) is carried out in an aqueous medium. The ratio of polyepoxide (a) and polyamine (b) is chosen so that 25 to 100%, preferably 50 to 100% of the epoxide equivalents are reacted with the amine. The microgels thus obtained have an average particle size of not more than 5 μm, are only slightly swellable in organic solvents and are suitable for use as organic fillers in aqueous paint formulations, such as, for example, electrodeposition coatings or filler coatings.

However, when exposed to heat, for example when heated to temperatures of 100°–300° C. for 10–60 minutes, said polymer microparticles tend to yellow, which must be regarded as a technological disadvantage in particular in white stoving finish formulations. There was therefore the need to eliminate this disadvantage entirely or at least in part.

Surprisingly, it has now been found that aqueous dispersions of highly crosslinked polymer particles can also be prepared by heating the compounds containing epoxide groups at temperatures of 30° to 100° C. in the presence of a catalytic amount of a Lewis base, nitrogen-containing organic compound (B) for one to 20 hour(s), while stirring.

In contrast to the stoichiometric reaction between epoxide and N—H groups on which EP-A 0 421 238 is based, the crosslinking in the present case is carried out by homopolymerization of the compounds containing epoxide groups, the homopolymerization being initiated by nitrogen-containing Lewis bases (B).

The use of aqueous dispersions (A) of the compounds containing epoxide groups is necessary for the preparation of the polymer microparticles, since when solvent-containing or solvent-free polyepoxides are heated in the presence of nitrogen-containing organic compounds, as is known (see, for example, H. Lee, K. Neville, Handbook of Epoxy Resins, MacGraw-Hill Book Co., 1967, Chapter 5), crosslinking takes place within the vessel or surface dimensions to form macroscopic networks (macrogelation), while in the case of dispersed epoxides, the crosslinking takes place within the micelle dimensions.

The microgels according to the invention in general have a spherical structure and are highly crosslinked, so that only slight or no swelling occurs in the presence of organic solvents. In particular, the polymer microparticles according to the invention display no or only a slight dark coloration when exposed to heat, and, since they have similar technological properties to the microgels known from EP-A 0 421 238, are therefore outstandingly suitable for the most diverse fields of use, for example as organic fillers or as matting agents in aqueous paint formulations.

The present invention therefore relates to epoxy resin-based crosslinked polymer microparticles (C) which are obtained by polymerization of aqueous dispersions (A) of compounds containing epoxide groups in the presence of up to 0.2 mol (based on the nitrogen contained in (B)) of a nitrogen-containing organic compound (B) per epoxide equivalent and subsequent isolation. The invention also relates to the aqueous dispersions of these crosslinked polymer microparticles.

The invention furthermore relates to a process for the preparation of aqueous dispersions (C) of crosslinked polymer microparticles, which comprises polymerizing aqueous dispersions (A) of compounds containing epoxide groups in the presence of up to 0.2 mol (based on the nitrogen contained in (B)) of a nitrogen-containing organic compound (B) per epoxide equivalent of the aqueous dispersion (A) at temperatures of 30° to 100° C. to give the crosslinked polymer particles.

Finally, the invention also relates to preferably aqueous paint formulations and coating and molding compositions which comprise the above microgel dispersions (C) or the crosslinked polymer microparticles isolated therefrom and which comprise, if appropriate, other inorganic and/or organic pigments, fillers and other customary paint additives.

The average mean particle size (primary particle size, determined by photocorrelation spectroscopy) of the microgels according to the invention in the aqueous dispersion is less than 5 μm, and preferably between 0.2 and 3.0 μm. The content of crosslinked polymer microparticles in the aqueous dispersions (C) is usually 10 to 90% by weight, preferably 40 to 70% by weight, and in particular 45 to 65% by weight, based on the dispersion. The viscosity of the microgel dispersions, measured by the Brookfield method at 25° C. is between 10 and 20000 mPa.s, preferably between 10 and 10000 mPa.s, and in particular between 100 and 6000 mPa.s. The glass transition temperature (of the isolated microgels) is preferably at least 30° C., and in particular at least 40° C.

The microgels according to the invention can contain crosslinking-active centers which are not yet crosslinking-active at room temperature. Examples which may be mentioned here are hydroxyl groups, carboxyl groups and masked isocyanate groups (urethane groups) and the like or mixtures thereof [in this context, see also W. E. Funke, J. of Coatings Technol., Volume 60, pages 67–76 (1988)]. In this way, the microgel is incorporated particularly firmly in the cured paint films by curing at elevated temperature, if appropriate in the presence of a catalyst, and also acts itself as a crosslinking agent (crosslinking filler). If hydroxyl groups and masked isocyanate groups, for example, are present at the same time, the microgels are even self-crosslinking.

The content of organic solvents in the aqueous microgel dispersions (C) is preferably less than 25% by weight, based on the dispersion, and in particular less than 10% by weight. The solvents may be already contained in the aqueous epoxy resin dispersions (A) and/or added during and/or after the polymerization reaction.

Possible organic solvents are, in particular, glycols, mono- and diethers and -esters of glycols with alcohols and acids, aliphatic alcohols having optionally branched alkyl radicals of 1 to 12 carbon atoms, cycloaliphatic and araliphatic alcohols, esters and ketones and aliphatic, cycloaliphatic and/or aromatic hydrocarbons, it being possible for these solvents to be employed individually or as a mixture.

Examples which may be mentioned are: ethylene glycol, ethylene glycol monomethyl ether, ethylene glycol dimethyl ether, diethylene glycol dimethyl ether, propylene glycol, propylene glycol monomethyl ether, propylene glycol dimethyl ether, butylglycol, butyldiglycol, methoxypropanol, ethoxypropanol, ethanol, 1- and 2-propanol, butanol, cyclohexanol, benzyl alcohol, diacetone alcohol, ethyl acetate, ethoxyethyl propionate, acetone, methyl ethyl ketone, cyclohexanone, hexane, cyclohexane, toluene and xylene.

Ethylene glycol, butylglycol, methoxypropanol, ethoxypropanol, 2-propanol and/or benzyl alcohol are preferably employed.

The aqueous microgels (C) furthermore can also comprise other customary paint additives, such as fillers, pigments, catalysts, flow or thickening agents, defoamers, wetting agents, preservatives, protective colloids and the like. Such additives are preferably added to the aqueous dispersion of the polymer microparticles when the polymerization reaction has ended.

The dispersions (C) according to the invention show no irreversible sedimentation phenomena over several days, and usually also over several weeks.

The aqueous dispersions (A) of compounds containing epoxide groups which are suitable for the preparation of the dispersions (C) according to the invention in general comprise one or more compounds containing epoxide groups having on average at least one, preferably at least two epoxide groups per molecule, which are dispersed in an aqueous medium in the presence of an external emulsifier (cf., inter alia, U.S. Pat. No. 4,122,067 and EP-A 0 081 163) or an internal, randomly incorporated emulsifier (so-called self-emulsifying epoxy resins).

Examples of such aqueous dispersions (A) of compounds containing epoxide groups are described in EP-A 51 483, DE-A 36 43 751 and DE-A 38 20 301, to which reference is made here.

Aqueous epoxy resin dispersions (A) which can be used for the preparation of aqueous polymer microparticle dispersions which still contain crosslinking-active centers are described in EP-A 0 421 238.

Aqueous epoxy resin dispersions which comprise the following components are preferably employed:

(1) 20 to 75% by weight, based on the total dispersion, of an epoxy resin which is a condensation product of
  a) 50 to 95, preferably 55 to 85% by weight of one or more epoxide compounds having on average at least one, preferably at least two epoxide groups per molecule and an epoxide equivalent weight of 90 to 3000 g/equivalent, and
  b) 5 to 50, preferably 15 to 45% by weight of an aromatic polyol;
(2) 3 to 20, preferably 4 to 15% by weight, based on the total dispersion, of an emulsifier comprising
  a) 20 to 100, preferably 40 to 60% by weight of a condensation product of an aliphatic polyol having an average molecular weight (Mw) of 200 to 20000 and an epoxide compound having at least two epoxide groups per molecule and an epoxide equivalent weight of 100 to 2000 g/equivalent, the ratio of equivalents of OH groups to epoxide groups being 1:0.85 to 1:1.5 and the epoxide equivalent weight of this condensation product being between 5000 and 400000 g/equivalent,
  b) up to 50, preferably up to 30% by weight of an organic solvent and
  c) up to 80, preferably 15 to 60% by weight of water;
(3) up to 10% by weight, based on the total dispersion, of organic solvents, any solvents present according to (2)b) also being included;
(4) water in the amount lacking to make up to 100% by weight.

These epoxy resin dispersions are prepared by stirring the epoxy resin (1) first with the emulsifier (2) and if appropriate organic solvents according to (3), and then with water (4).

The epoxy resin corresponding to (1) preferably has an epoxide equivalent weight of 350 to 4000 g/equivalent, in particular 400 to 3000 g/equivalent. The average particle size of the dispersed resin is as a rule not greater than 1.0 $\mu$m, and is preferably 0.2 to 0.8 $\mu$m. The content of this resin in the total dispersion is 20 to 75% by weight, preferably about 25 to 65% by weight.

The 1,2-epoxide compounds corresponding to (1)a) and (2)a) are polyepoxides having on average at least more than one, preferably at least two epoxide groups per molecule. These epoxide compounds can be either saturated or unsaturated as well as aliphatic, cycloaliphatic, aromatic and/or heterocyclic, and can also contain hydroxyl groups. They can furthermore contain those substituents and/or functional groups which cause no troublesome side reactions under the mixing or reaction conditions, for example alkyl or aryl substituents, ether groupings and the like.

These epoxide compounds are preferably polyglycidyl ethers based on polyhydric, preferably dihydric alcohols, phenols, hydrogenation products of these phenols and/or novolaks (reaction products of mono- or polyhydric phenols with aldehydes, in particular formaldehyde, in the presence of acid catalysts). The epoxide equivalent weights of these epoxide compounds are preferably between 90 and 500 g/equivalent, in particular between 100 and 350 g/equivalent.

Examples which may be mentioned of polyhydric phenols are: resorcinol, hydroquinone, 2,2-bis-(4-hydroxyphenyl)propane (bisphenol A), isomer mixtures of dihydroxydiphenylmethane (bisphenol F), tetrabromobisphenol A, 4,4'-dihydroxydiphenylcyclohexane, 4,4'-dihydroxy-3,3'-dimethyldiphenylpropane, 4,4'-dihydroxydiphenyl, 4,4'-dihydroxybenzophenol, bis-(4-hydroxyphenyl)-1,1-ethane, 2,2-bis[4-(2-hydroxypropoxy)phenyl]-propane, bis-(4-hydroxyphenyl)-1,1-isobutane, bis-(4-hydroxy-tert.-butylphenyl)- 2,2-propane, bis-(2-hydroxynaphthyl)methane, 1,5-dihydroxynaphthalene, tris-(4-hydroxyphenyl)-methane, bis-(4-hydroxyphenyl) ether, bis-(4-hydroxyphenyl) sulfone and others, and the halogenation and hydrogenation products of the abovementioned compounds. Bisphenol A is particularly preferred here.

Examples of polyhydric alcohols which may be mentioned are ethylene glycol, diethylene glycol, triethylene glycol, polyethylene glycols (n=1 to 35), 1,2-propylene glycol, polypropylene glycols (n=1 to 15), 1,3-propylene glycol, 1,4-butanediol, 1,5-pentanediol, 1,6-hexanediol, 1,2,6-hexanetriol, glycerol, neopentylglycol, trimethylolethane, trimethylolpropane and reaction products of aromatic, aliphatic or cycloaliphatic polyols, for example trimethylolpropane or bisphenol A, with ethylene oxide and/or propylene oxide. Polypropylene glycols (n=8–10) are particularly preferred here.

It is also possible to use polyglycidyl esters of polycarboxylic acids which are obtained by reaction of epichlorohydrin or similar epoxide compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerized linolenic acid. Examples are diglycidyl adipate, diglycidyl phthalate and diglycidyl hexahydrophthalate.

A detailed list of suitable epoxide compounds is to be found in the handbook "Epoxidverbindungen und Epoxidharze (Epoxide Compounds and Epoxy Resins)" by A. M. Paquin, Springer Verlag, Berlin 1958, Chapter IV and in the work by Lee and Neville already cited above. The epoxide compounds mentioned can be employed individually or as a mixture.

Possible aromatic polyols corresponding to (1)b) are preferably the aromatic compounds containing OH groups which have been described above for components (1)a) and (2)a), i.e. polyhydric, preferably dihydric phenols, halogenation products thereof and/or novolaks. Here also, bisphenol A is particularly preferred.

The aliphatic polyols of component (2)a) are preferably polyether-polyols (polyalkylene glycols) having average molecular weights (Mw; gel permeation chromatography; polystyrene standard) of preferably between 600 and 12000, in particular 2000 to 8000, and OH numbers advantageously of 10 to 600, preferably 15 to 120. These polyether-polyols preferably have only terminal primary OH groups. Examples which may be mentioned here are block copolymers of ethylene oxide and propylene oxide as well as polyethylene glycols and polypropylene glycols, it also being possible to employ mixtures of the particular polyalkylene glycols. Polyethylene glycols are preferably used.

The dispersing agent (2)a) is preferably prepared by condensation of the polyether-polyols mentioned with the polyglycidyl ethers in the presence of suitable catalysts at 50° to 200° C., preferably at 90° to 170° C. the ratio of equivalents of OH groups to epoxide groups being 1:0.85 to 1:1.5, preferably 1:0.95 to 1:1.25, and the epoxide equivalent weight of the condensation product being at least 5000 g/equivalent, preferably 100000 g/equivalent to 400000 g/equivalent.

Suitable catalysts for the preparation of the dispersing agent (2)a) are strong inorganic and organic bases, such as, for example, sodium hydroxide, potassium hydroxide, lithium hydroxide, barium hydroxide and strontium hydroxide, alkali metal alcoholates, such as sodium methylate, lithium methylate, sodium ethylate and potassium dodecylate, and the alkali metal salts of carboxylic acids, such as, for example, sodium stearate and lithium stearate.

Strong inorganic and organic protonic acids, for example phosphoric acid, sulfuric acid, tetrafluoroboric acid and benzenesulfonic acid, are likewise suitable. Lewis acids furthermore can be used as catalysts. Examples which may be mentioned are tin(IV) tetrachloride, titanium(IV) tetrachloride, titanium(IV) tetraisopropylate, triethyloxonium tetrafluoroborate and boron trifluoride and its complexes, for example with phosphoric acid, acetic acid (1:1 and 1:2), methanol, diethyl ether, tetrahydrofuran, phenol, ethylene glycol monoethyl ether, polyethylene glycol (molecular weight 200), dimethylsulfoxide, di-n-butyl ether, di-n-hexyl ether, succinic acid and aliphatic, cycloaliphatic or araliphatic amines, as well as nitrogen-containing heterocyclic compounds.

$BF_3$-Diethyl ether, $BF_3$-acetic acid and aqueous tetrafluoroboric acid are preferably employed as catalysts. The amount of catalyst in general is 0.1 to 5, preferably 0.1 to 1% by weight, based on the reaction mixture. The catalyst can be diluted with one of the abovementioned organic solvents for better metering.

To prepare the dispersing agent, the mixtures of compounds containing hydroxyl groups and epoxide groups to be reacted are heated up to the temperature at which the condensation proceeds at an adequate rate, i.e. in 30 minutes to 5 hours. The reaction is advantageously monitored via the increase in the epoxide equivalent, which indicates a decrease in epoxide groups. The reaction can be interrupted by cooling to below the reaction temperature.

The condensation product (2)a) thus obtained can be used as such (100% strength) as the dispersing agent (2) for the preparation of the epoxy resin dispersions. Preferably, however, for better handling, a mixture of 20 to 99, preferably 40 to 60% of the condensation product (2)a) and an aqueous medium comprising (based on the total mixture) up to 50, preferably up to 30% of an organic solvent (2)b) and 1 to 80%, preferably 15 to 60%, of water (2)c) is preferred and this mixture is used as the emulsifier (2).

Possible organic solvents corresponding to component (2)b) are those mentioned above, butylglycol, methoxypropanol, ethoxypropanol, 2-propanol and/or benzyl alcohol preferably being used.

The epoxy resin dispersions preferably used comprise 4 to 15% by weight of the emulsifier (2).

Possible organic solvents according to component (3) are likewise the abovementioned solvents, preferred solvents again being butylglycol, methoxypropanol, ethoxypropanol, 2-propanol and/or benzyl alcohol.

The total content of organic solvents in the dispersion, calculated as the sum of the amount of solvents (2)b) and (3), is up to 10% by weight, based on the total dispersion, preferably less than 6% by weight.

To prepare the epoxy resin dispersions preferably used, the epoxy resin (1) is first prepared by condensation of components (1)a) and (1)b) at elevated temperatures, in general at 100° to 220° C. preferably at 150° to 180° C. in the presence of a catalyst which accelerates the condensation.

If two or more epoxide compounds (1)a) are employed, the condensation reaction is preferably carried out in two stages such that one or more components (1)a) are reacted in a first reaction with the components according to (1)b) in a ratio of amounts such that this first condensation product has an epoxide equivalent weight of greater than 5000 g/equivalent, preferably greater than 20000 g/equivalent, and still contains free phenolic groups, and this first condensation product is reacted in a further condensation reaction with further epoxide compounds according to (1)a) such that the desired epoxy resin (1) is finally obtained.

Examples of suitable condensation catalysts are phosphines, such as triphenylphosphine, phosphonium salts, such as, for example, benzyltrimethylphosphonium chloride, tertiary amines, such as N,N-dimethylbenzylamine, quaternary ammonium salts, such as, for example, tetramethylammonium chloride, alkali metal hydroxides, such as sodium hydroxide and lithium hydroxide, alkali metal carbonates, such as sodium carbonate and lithium carbonate, alkali metal salts of organic acids, such as, for example, sodium formate, lithium benzoate and lithium stearate, Lewis acids, such as, for example, boron trifluoride and its complexes, titanium tetrachloride, tin chloride and triethyloxonium tetrafluoroborate.

The dispersing agent (2) and if appropriate organic solvents according to (3) are then added to the epoxy resin (1) and the mixture is stirred for some time, preferably for 15 to 180, in particular 30 to 90 minutes. The addition of the dispersing agent is carried out at higher temperatures, for example at 60° to 200° C. preferably at 70° to 120° C.

Thereafter, the corresponding amount of water (4) is metered in, preferably in several part amounts, while stirring vigorously, whereupon the aqueous dispersion is formed. The water is also added at elevated temperatures, for example at 30° to 100° C., preferably at 50° to 90° C.

Customary additives, such as flow or thickening agents, defoamers, wetting agents, preservatives, protective colloids and the like, can then also be added.

The epoxy resin (1) is advantageously dispersed in water using suitable dispersing apparatuses, for example a high-speed blade stirrer, a pulsed helical ribbon impeller, a colloid mill, a homogenizer, a dissolver or another high-speed mixer with a high shearing force.

The total solids content of the aqueous epoxy resin dispersions preferably employed can be between 10 and 80% by weight, and is advantageously between 35 and 70% by weight, preferably between 45 and 65% by weight. The content of water is preferably 20 to 80, in particular 30 to 60% by weight.

The viscosity of these epoxy resin dispersions is in general between 200 and 30000 mPa.s, preferably between 750 and 7000 mPa.s.

The epoxy resin dispersions can also comprise customary additives, such as flow or thickening agents, defoamers, wetting agents, preservatives, protective colloids and the like.

Catalytically active compounds according to (B) which can be employed are in principle all the aliphatic, cycloaliphatic, araliphatic, aromatic, heterocyclic and/or heteroaromatic compounds which contain at least one nitrogen atom which has a free electron pair (Lewis bases). Suitable compounds (B) can contain one or more nitrogen atoms which comply with the above definition, and, if several nitrogen atoms as defined are present, their substitution pattern can be identical or different. The compounds furthermore can also contain other functional groups, such as, for example, hydroxyl, carboxyl and thiol groups, halogens, double bonds or amide groups.

Compounds which are particularly suitable are tertiary amines, such as, for example, triethylamine, tributylamine, N-methyl-piperidine, N,N-dimethylbenzylamine, N,N-dimethylethanolamine and N-methyldiethanolamine, and aromatic nitrogen-containing heterocyclic compounds, such as, for example, (substituted) imidazole(s), pyridine(s) and (iso)quinoline(s).

However, since primary and secondary amines react with the epoxide groups present in (A) to form tertiary amino groups under the preparation conditions, compounds with primary and/or secondary amino groups can also be used.

Examples which may be mentioned are: propylamines, butylamines, octylamines, cyclohexylamine, benzylamine, ethanolamine, fatty amines, diethylamine, dipropylamine, diethanolamine, pyrrolidine, piperidine and N-methylbenzylamine.

Examples which may be mentioned of compounds (B) which contain several nitrogen atoms are: ethylenediamine, hexamethylenediamine, 2-methylpentamethylenediamine, neopentanediamine, cyclohexanediamine, trimethylhexamethylenediamine, isophoronediamine, meta-xylylenediamine, phenylenediamine, diazabicyclooctane, diethylenetriamine, triethylenetetramine, bis-hexamethylenediamine, 2-aminoethyl-piperazine, bis(aminopropyl)methylamine, N,N-dimethylaminopropylamine, N,N,N',N'-tetramethylethylenediamine and N,N,N',N'',N''-pentamethyl-diethylenetriamine.

Reaction products of nitrogen compounds, such as, for example, Mannich bases, polyoxyalkylene-amines, melamine derivatives and/or epoxide-amine adducts can of course also be used as initiators (B) containing basic nitrogen.

Suitable compounds (B) can be employed individually or as a mixture.

Triethylamine, N,N-dimethylethanolamine, N-methyldiethanolamine, N,N-dimethylbenzylamine, piperidine and bis(aminopropyl)methylamine are preferably used for the preparation of the polymer microparticle dispersions (C) according to the invention.

The catalytically active nitrogen compounds (B) are employed for the preparation of the aqueous microgel dispersions according to the invention in an amount of up to 0.2 mol (based on the nitrogen contained in (B)) per epoxide equivalent of the aqueous epoxy resin dispersions (A). Since use of amounts of (B) which are too high leads to a deterioration in the technological properties of the polymer microparticles, in particular to a greater tendency to yellow, and on the other hand the reaction time until all the epoxide groups have reacted is significantly increased if amounts of (B) which are too low are used, the nitrogen compounds (B) are preferably employed in an amount of 0.02–0.15 mol (based on the nitrogen contained in (B) per epoxide equivalent in (A). Moreover, the person skilled in the art can easily determine the amount of (B) which is the optimum in respect of reaction time and technological properties of the product by preliminary experiments.

The catalytically active compounds (B) can be employed as such in the preparation of the microgel dispersions. To ensure faster and better distribution in the epoxy resin dispersions (A), however, the initiators (B) are preferably dissolved in an organic solvent (mixture) and/or water. Suitable organic solvents are those described above.

To prepare the microgel dispersions (C) according to the invention, the aqueous epoxy resin dispersion (A) is first preferably heated to a temperature of 30° to 100° C. under an inert gas atmosphere, such as, for example, under nitrogen or argon, while stirring thoroughly. The reaction temperature is limited to not more than 100° C. (boiling point of water) due to the aqueous, low-solvent character of the epoxy resin dispersion (A), but on the other hand the progress of the reaction is sluggish if the reaction temperatures are too low. The mixture is therefore preferably heated to a temperature of 60° to 95° C. If appropriate, further organic solvents can be added.

When the reaction temperature has been reached, the organonitrogen compound (B) is added, preferably as a solution in an organic solvent (mixture) and/or water, and stirring is continued until the residual epoxide equivalent weight of the reaction mixture is more than 20,000 g/equivalent, preferably more than 50,000 g/equivalent.

A high degree of crosslinking of the resulting polymer microparticles can also be seen by the fact that, in contrast to the starting epoxy resin dispersion (A), the reaction mixture is no longer soluble in acetone or other organic solvents to give a clear solution.

The polymerization reaction of the compounds in (A) containing epoxide groups has in general ended after a period of one to twelve hour(s).

If appropriate, further organic solvents and other customary paint additives, such as fillers, pigments, catalysts, flow or thickening agents, defoamers, wetting agents, preservatives, protective colloids and the like, can be added to the finished aqueous polymer microparticle dispersion.

The invention furthermore relates to the crosslinked polymer microparticles themselves, which can be isolated in the dry form from the aqueous dispersions (C) of these polymer microparticles by known methods. Methods which may be mentioned here are, for example, electrolyte precipitation, spray drying, freeze drying or centrifugation. The polymer microparticles in general are obtained here in a finely divided, pulverulent form. However, an increase in the primary particle size takes place during drying of the polymer microparticle dispersions, due to agglomeration or aggregation. The dried microgels are storage-stable as such and undergo no further chemical or physical changes at room temperature. The microgels which have been isolated can be redispersed or suspended in aqueous or organic media. In order to achieve sufficiently fine-particled and therefore stable dispersions or suspensions, the dispersion in the desired medium is advantageously carried out using suitable dispersing apparatuses, for example with a dissolver, a colloid mill or another high-speed mixer. Aqueous media which correspond in composition to the starting polymer microparticle dispersions (C) are preferably used for the redispersion.

The microgel dispersions according to the invention and the microparticles isolated therefrom are outstandingly suitable as organic fillers, matting agents and/or reinforcing agents for binder systems, paints, coating and molding compositions, adhesives and the like, especially those based on water. Possible water-based paints, which is intended to mean here that these comprise not more than 25% by weight, preferably not more than 10% by weight, based on the water, of customary paint solvents, are, for example, the usual electrodeposition coatings for priming vehicle bodies, filler coatings for automobile finishes, and also building paints and floor coatings.

They are used in particular for partial replacement of white pigments and/or fillers in paints, and in some cases also as crosslinking fillers and as a filler for transparent paints.

Compared with conventional white pigments, such as titanium dioxide, basic lead silicate, lithopones, zinc oxide, bentones and zinc sulfide, and fillers, such as talc, kaolin, mica, feldspar, barium sulfate, calcium sulfate, calcium carbonate and the like, the organic microgels according to the invention have as advantages a significantly lower density and therefore also an increased yield, i.e. the coating volume which can be achieved can be obtained with a significantly lower amount by weight of pigment than with systems comprising inorganic fillers.

The microgel dispersions according to the invention and the microgels isolated therefrom furthermore exhibit an adequate fineness which allows them to be used without further trituration or grinding. They can therefore be employed directly as an aqueous dispersion, and accordingly allow greatly simplified handling and adjustment of a variable pigment/binder ratio (PBR) within wide .limits.

Since the microgels according to the invention mainly have a spherical particle shape, no major changes in the rheological properties of the paint system occur by replacing conventional pigments or fillers with the polymer microparticles.

Compared with the microgels based on epoxy resin which are known from EP-A 0 421 238, the polymer microparticles according to the invention are distinguished by a drastically reduced tendency to yellow or darken when exposed to heat, and are therefore particularly suitable for uses in stoving finishes.

EXAMPLES

I. Preparation of the aqueous epoxy resin dispersion preferably used

1) Preparation of the dispersing agent (2)

225.1 g of industrial polyethylene glycol having an average molecular weight (Mw) of 4000 g/mol and 24.9 g of a polyglycidyl ether based on bisphenol A having an epoxide equivalent weight of 183 g/equivalent were heated together to 100° C., and 0.35 ml of 50% strength aqueous tetrafluoroboric acid was added, while stirring. The ratio of equivalents of OH groups to epoxide groups was 1:1.20. The mixture was heated further to 130° C. and kept at this temperature until the epoxide equivalent weight of the reaction product was about 100000 g/equivalent. This product was then dissolved in a mixture of 125 g of water and 125 g of 2-propanol, while stirring and heating gently at about 70° C. The slightly yellowish, clear emulsifier solution obtained had a viscosity (Ubbelohde, 25° C.) of 2300 mPa.s and a solids content of 50% by weight.

2) Preparation of an aqueous epoxy resin dispersion 59 g of a polypropylene glycol diglycidyl ether having an epoxide equivalent weight of 330 g/equivalent and 91 g of bisphenol A were heated to 120° to 125° C. in a nitrogen inert gas atmosphere in a 1 l four-necked flask fitted with a thermometer, blade stirrer, reflux condenser, dropping funnel and heating device, while stirring, and 170 mg of catalyst 1201 from Shell Chemie were then added. Thereafter, the reaction mixture was heated to 150° to 160° C. and kept at this temperature until the epoxide equivalent weight of the product was greater than 100000 g/equivalent. After the mixture had been cooled to 120° to 130° C., 288 g of a polyglycidyl ether based on bisphenol A and having an epoxide equivalent weight of 183 g/equivalent and a further 150 mg of the catalyst were added, and the mixture was heated again to 150° to 160° C. It was kept at this temperature until the condensation product had an epoxide equivalent weight of 460 to 470 g/equivalent and was then cooled to 95° C. 76 g of the emulsifier prepared according to Example I.1) were then added, while stirring thoroughly, and the mixture was stirred for 60 minutes, during which the temperature dropped to 80° C. At a stirring speed of about 600 revolutions per minute, 70 g of deionized water were then uniformly metered in over a period of 15 minutes and the mixture was stirred for 45 minutes. Thereafter, a further 90 g of deionized water were metered in at 65° C. and the mixture was stirred for 60 minutes. Finally, the aqueous dispersion formed was further diluted with another 190 g of deionized water, and 900 mg of Mergal K 9 N from Riedel-de-Haen (preservative) were added. The finished dispersion had a solids content of 55.4% by weight, a viscosity of 2300 mPa.s (Brookfield, 25° C.)

shown in column [I], the viscosity (Brookfield, 25° C.) shown in column [K], the pH (undiluted) shown in column [L] and the particle size (photocorrelation spectroscopy) shown in column [M]. The microgels isolated by freeze drying were not soluble in the organic solvents tested (methoxypropanol, ethoxypropanol, ethanol, acetone and glacial acetic acid).

TABLE 1

| A Ex. No. | B Parts by weight of dispersion | C Solids content of the dispersion [%] | D Parts by weight of N-containing compound | E N-containing compound used | F Amount of initiator (per epoxide equivalent of the dispersion) [mol] | G Temperature [°C.] | H Duration [hrs] | I Solids content [%] | K Viscosity [mPa·s] | L pH | M Particle size [nm] |
|---|---|---|---|---|---|---|---|---|---|---|---|
| II.1 | 600 | 55.4 | 5 | N,N-Dimethylethanolamine | 0.083 | 80 | 7 | 55.7 | 1750 | 12.4 | 465 |
| II.2 | 690 | 50.0 | 5 | Imidazole | 0.108 | 70 | 6 | 50.4 | 175 | 5.3 | 641 |
| II.3 | 690 | 50.0 | 5 | Triethylamine | 0.077 | 70 | 6 | 49.9 | 363 | 12.3 | 772 |
| II.4 | 690 | 50.0 | 2 | Triethylamine | 0.029 | 70 | 10 | 50.7 | 325 | 9.8 | 615 |
| II.5 | 647 | 50.0 | 1 | Triethylamine | 0.015 | 70 | 16 | 51.1 | 213 | 8.8 | 786 |
| II.6 | 690 | 50.0 | 5 | N,N-Dimethylbenzylamine | 0.055 | 70 | 7 | 50.1 | 263 | 11.4 | 631 |
| II.7 | 637 | 53.0 | 5 | Piperidine | 0.089 | 80 | 6 | 53.1 | 550 | 11.2 | 511 |
| II.8 | 644 | 53.0 | 5 | N,N-Dimethylaminopropylamine | 0.098 | 80 | 5 | 53.4 | 4150 | 12.8 | 615 | and an average particle size of 540 nm (photocorrelation spectroscopy). The dispersions were in some cases diluted to lower solids contents with further deionized water immediately before use for the preparation of microgels.

II. Preparation of the aqueous microgel dispersions according to the invention (For the numerical data, see Table 1)

[B]parts of the aqueous epoxy resin dispersion prepared according to I.2) with the solids content shown in column [C] were heated to the temperature shown in column [G] in a 1 l four-necked flask with a thermometer, stirrer, reflux condenser, dropping funnel and heating device, while stirring thoroughly under nitrogen. [D]parts by weight of the nitrogen-containing compound [E], dissolved in the same amount by weight of 2-propanol (apart from Example [A] 2), in which imidazole was employed as such) were added rapidly at this temperature. Stirring was continued at the temperature shown in [G] until, after the period of time shown in column [H], the resulting microgel dispersion had a residual epoxide equivalent weight of greater than 50000 g/equivalent (note: for determination of the residual epoxide equivalent weight, the amine number of the reaction mixture is determined twice on samples of adequate size, once in the presence of tetra-n-butylammonium bromide (unreacted epoxide groups also detected). The residual epoxide equivalent weight is then obtained from the amine numbers determined as follows:

$$\text{Residual epoxide equivalent weight} = \frac{56 \times 100}{(AN_{TBAB} - AN_0)}$$

where:

$AN_{TBAB}$ = amine number, determined in the presence of tetrabutylammonium bromide and $AN_0$ = amine number, determined without tetrabutylammonium bromide The mixtures were then cooled to 40° to 50° C. and the aqueous microgel dispersions were filtered. The finished microgel dispersions had the solids content III. Testing of the microgel dispersions according to the invention 1) Testing of the tendency to yellow To test the yellowing under exposure to heat, a microgel dispersion according to the invention (Example II.1)) and a microgel dispersion according to EP-A 0 421 238, Example 4.1. (epoxy resin dispersion crosslinked stoichiometrically with amines) were in each case drawn onto panes of translucent glass in a wet film thickness of 200 μm and then heated at 150° C. and 250° C. in a circulating air oven for 60 minutes. The residues which remained were evaluated in respect of their yellowing in accordance with the iodine color number scale (Table 2).

TABLE 2

| | Heated at 150° C. for 60 minutes | Heated at 250° C. for 60 minutes |
|---|---|---|
| Microgel dispersion Example II.1 according to the invention | ICN 1 | ICN 8 |
| Example 4.1 according to EP-A 0 421 238 | ICN 4 | ICN 18 |

2) Testing of the microgels according to the invention as a filler (partial replacement for titanium dioxide) in electrodeposition coatings for cataphoresis All the amounts data are given in parts by weight. The sieve residue and the "L sheet" coating were determined and carried out as follows:

Sieve residue: 1 l of the dilute paint solution was poured through a weighed Perlon sieve (mesh width 30 μm). The sieve was then rinsed with deionized water and, after drying (1 hour at 125° C.) was weighed. The difference between the two weighings gives the sieve residue in mg per 1000 ml of bath.

"L sheet" coating: A zinc phosphatized steel sheet (about 10×20 cm) was bent to a right angle at the lower end (3 cm horizontal surface) and suspended in the coating bath such that the horizontal arm of the "L" was about 15 cm below the surface of the paint bath. Coating was carried out while stirring and over a coating time of 4 minutes. At the end of the coating, the sheet remained in the bath for a further two minutes. The sheet was then removed from the bath, rinsed with water for a further two minutes and stoved. The sheet was evaluated visually in respect of flow, gloss and sedimentation phenomena.

2.1) Preparation of the binder dispersion [analogous to EP-A 0 421 238, Example (5.1)]

a) 210 parts of diethanolamine, 102 parts of N,N-dimethylaminopropylamine and 636 parts of an adduct of one mol of 2-methylpentamethylenediamine and two mol of the glycidyl ester of Versatic acid (Cardura ® E10, Shell Chemie) were introduced into 3400 parts of bisphenol A epoxy resin (epoxide equivalent weight about 480 g/equivalent) in 2341 parts of methoxypropan-2-ol. The reaction mixture was stirred at 60° to 90° C. for four hours and then at 120° C. for one hour. Hydroxyl number: about 155 mg of KOH/g of solid resin; amine number: about 77 mg of KOH/g of solid resin. 120.6 parts of this binder solution were mixed with 32.7 parts of a curing agent solution [see 2.1)b)], 5 parts of Texanol, 1.5 parts of 2-ethylhexanol and 2.3 parts of 50% strength aqueous formic acid, and the mixture was concentrated to a solids content of about 90% by weight in vacuo at temperatures of up to 80° C. A 40% strength by weight dispersion having an average particle size of 216 nm was then prepared with 139 parts of deionized water, while stirring thoroughly.

b) 124 parts of butylglycol and 0.3 part of dibutyltin laurate were allowed to run into 174 parts of Desmodur T 80 (80% of 2,4- and 20% of 2,6-toluylene diisocyanate) at 40° to 60° C. over a period of 60 to 120 minutes, and the mixture was then kept at this temperature until a % NCO value of about 12.8 to 13.5 was obtained. 42.4 parts of trimethylolpropane were introduced in portions into 298 parts of this compound in 146 parts of toluene, and the mixture was reacted at 80° C. to a % NCO value of practically 0.

2.2) Preparation of a paste resin and preparation of pigment pastes containing microgels [analogously to EP 0 421 238, Example (5.2)]

a) 1708 parts of Denacol ® EX-145 (phenol(EO)$_5$-glycidyl ether) were allowed to run into a solution of 204 parts of N,N-dimethylaminopropylamine in 1224 parts of ethoxypropanol at 60° to 80° C. in the course of one hour, and the mixture was then kept at 80° to 100° C. until the epoxide equivalent weight was more than 100000 g/equivalent (amine number about 117 mg of KOH/g of solid resin; about 60% strength by weight). 72 parts of deionized water and 400 parts of 90%-strength lactic acid were allowed to run into this solution, while cooling, and the mixture was then diluted to 60% by weight with 128 parts of butylglycol.

b) 1280 parts of Beckopox ® SEP 311 (75% strength in xylene) were heated to 80° C. 1184 parts of the urethane 2.2)d) were allowed to run into this solution in the course of one hour, and the mixture was kept at 80° C. until the % NCO value was practically 0, the solvent was distilled off in vacuo and the residue was diluted to about 60% strength by weight with 1232 parts of ethoxypropanol.

c) 2.2)a) was introduced into the solution obtained under 2.2)b) and the mixture was kept at 60° to 80° C. until an acid number of practically 0 and an epoxide equivalent weight of greater than 100000 g/equivalent were reached.

d) 540 parts of iso-octadecyl alcohol and 0.9 part of dibutyltin laurate were allowed to run into 348 parts of Desmodur T 80 in 296 parts of xylene at 40° to 60° C. and the mixture was then kept at this temperature until a NCO value of about 9.5 was reached. Pigment pastes were prepared from the paste resin solution according to 2.2)c) in accordance with the following formulation: 8.82 parts of dibutyltin oxide were added to 23 parts of paste resin solution (about 60% strength by weight), the mixture was homogenized thoroughly at 40° to 60° C. for one hour, 13.73 parts of 75% strength by weight aqueous basic lead silicate paste, 2.94 parts of carbon black colorant Printex ® 25 and 11 parts of titanium dioxide RSE 50 were added, the mixture was homogenized thoroughly, deionized water was then added to a grinding viscosity and the mixture was ground on a bead mill. This preliminary pigment paste was then blended with 75.6 parts of microgel dispersions II.2 and II.3 on a dispersing apparatus and adjusted to a solids content of 60% by weight with deionized water (53.0% by weight of microgel in the total amount of pigment, pigment/binder ratio in the paste 5.1:1).

2.3) Testing the electrodeposition coating containing microgel 1000 parts of the aqueous cataphoretic deposition coating binder dispersion obtained according to 2.1)a) were adjusted to a solids content of 25% by weight with deionized water. In each case 136.8 parts of the pigment pastes obtained according to 2.2) were then added to this varnish, while stirring, and the mixture was subsequently adjusted to a solids content of 18% by weight (1 hour at 125° C.) with deionized water. The paints were subjected to cataphoretic deposition in an open glass vessel. Phosphated steel sheet (Bonder ® 26 from Chemetall) was used as the cathode and bright steel sheet was used as the anode at a distance of 5 to 10 cm from the cathode. The bath temperature was 32° C. and the deposition time was two minutes. The coated sheets were stoved at an oven temperature of 170° C. (circulating air oven) for 20 minutes. In addition, after 24 hours and four weeks (stirring at room temperature), the sieve residue was determined and an "L sheet" coating was carried out. The results are summarized in Table 3.

TABLE 3

| Microgel used in the pigment paste | Coating thickness [μm] | Breakdown voltage [V] | Roughness value [μm] | Flow | Sieve residue after 1 day [mg/l] | Sieve residue after 4 weeks [mg/l] | L sheet after 1 day | L sheet after 4 weeks |
|---|---|---|---|---|---|---|---|---|
| Ex. II.2 According to the invention | 22–23 | 375 | 0.25–0.35 | OK | 0 | 65 | OK | SM |
| Ex. II.3 according to the invention | 19–21 | 425 | 0.2–0.3 | OK | 23 | 74 | OK | SM |
| Ex. 5.3.3 | 18–19 | 350 | n.s. | OK | 10 | 20 | OK | OK |

TABLE 3-continued

| Microgel used in the pigment paste | Coating thickness [μm] | Breakdown voltage [V] | Roughness value [μm] | Flow | Sieve residue after 1 day [mg/l] | Sieve residue after 4 weeks [mg/l] | L sheet after 1 day | L sheet after 4 weeks |
|---|---|---|---|---|---|---|---|---|
| according to EP 0 421 238 Ex. 5.3.12 (no microgel) according to EP 0 421 238 | 17-18 | 350 | n.s. | OK | 10 | 80 | OK | OK |

Abbreviations:
n.s. - not stated;
OK = in order, no sedimentation phenomena;
SM - slight matting.

3) Use of the microparticle dispersions according to the invention as matting agents in an aqueous binder system 50 g of deionized water were added to the same amount by weight of the aqueous epoxy resin curing agent Beckopox® special curing agent EH 623 (Hoechst AG) and the mixture was stirred thoroughly. 244 g of the aqueous epoxy resin dispersion prepared under I.2) and 1198 g of a microgel dispersion of Example II.1) according to the invention were added to this solution, while stirring continuously. After a short waiting time, the aqueous coating mixture was drawn onto a thoroughly degreased sheet of glass with a wet film thickness of 200 μm and allowed to dry at room temperature. The coating was dry to dust after 30 minutes and non-tacky after 2 hours. It had a pendulum hardness (according to König) of 70 seconds after a curing time of one day (at room temperature) and a pendulum hardness of 100 seconds after one week. The degree of gloss (according to Lange) determined after a curing time of one week was 2.1% at 20° and 7.6% at 60°.

We claim:

1. Crosslinked polymer microparticles based on epoxy resin, obtained by polymerization of an aqueous dispersion (A) of a compound containing epoxide groups in the presence of up to 0.2 mol (based on the nitrogen contained in (B)) of a nitrogen-containing organic compound (B) per epoxide equivalent and subsequent isolation.

2. An aqueous dispersion of crosslinked polymer microparticles based on epoxy resin, obtained by polymerization of an aqueous dispersion (A) of a compound containing epoxide groups in the presence of up to 0.2 mol (based on the nitrogen contained in (B)), of a nitrogen-containing organic compound (B) per epoxide equivalent.

3. An aqueous dispersion as claimed in claim 1, which has an average particle size of not more than 5 μm, and a content of crosslinked polymer microparticles of at least 10% by weight.

4. An aqueous dispersion as claimed in claim 2, which contains, as the solvent, a glycol, a mono- or diether or -ester of a glycol, an aliphatic alcohol having optionally branched alkyl radicals with 1 to 12 carbon atoms, a cycloaliphatic or araliphatic alcohol, an ester or ketone or an aliphatic, cycloaliphatic and/or aromatic hydrocarbon, individually or as a mixture, in an amount of up to 25% by weight.

5. An aqueous dispersion as claimed in claim 2, which comprises the other further customary paint additives, such as fillers, pigments, catalysts, flow or thickening agents, defoamers, wetting agents, preservatives, protective colloids.

6. An aqueous dispersion as claimed in claim 2, wherein the polymer microparticles also contain additional crosslinking-active centers.

7. An aqueous dispersion as claimed in claim 2, obtained by polymerization in the presence of an aliphatic, cycloaliphatic, araliphatic, aromatic, heterocyclic and/or heteroaromatic compound which contains at least one nitrogen atom which has a free electron pair.

8. An aqueous dispersion as claimed in claim 2, obtained by reaction in the presence of triethylamine, N,N-dimethyl-ethanolamine, N-methyl-diethanolamine, N,N-dimethyl-benzylamine, piperidine and/or bis(aminopropyl)methylamine.

9. An aqueous dispersion as claimed in claim 2, wherein the aqueous epoxy resin dispersion (A) employed is one which comprises the following components:

(1) 20 to 75% by weight, based on the total dispersion, of an epoxy resin which is a condensation product of
  a) 50 to 95% by weight of one or more epoxide compounds having on average at least one epoxide group per molecule and an epoxide equivalent weight of 90 to 3000 g/equivalent, and
  b) 5 to 50% by weight of an aromatic polyol;

(2) 3 to 20% by weight, based on the total dispersion, of an emulsifier comprising
  a) 20 to 100% by weight of a condensation product of an aliphatic polyol having an average molecular weight (Mw) of 200 to 20000 and an epoxide compound having at least two epoxide groups per molecule and an epoxide equivalent weight of 100 to 200 g/equivalent, the ratio of equivalents of OH groups to epoxide groups being 1:0.85 to 1:1.5 and the epoxide equivalent weight of this condensation product being between 5000 and 40000 g/equivalent,
  b) up to 50% by weight of an organic solvent and
  c) up to 80% by weight of water;

(3) up to 10% by weight, based on the total dispersion, of organic solvents, any solvents present according to (2)b) also being included;

(4) water in the amount lacking to make up to 100% by weight, and which is prepared by stirring the epoxy resin (1) first with the emulsifier (2) and optionally an organic solvent according to (3), and then with water (4).

10. A process for the preparation of an aqueous dispersion of crosslinked polymer microparticles (C) as claimed in claim 2, which comprises first heating the aqueous epoxy resin dispersion (A), under an inert gas atmosphere, to a temperature of 30° to 100° C., while stirring, optionally also adding an organic solvent, subsequently adding the organonitrogen compound (B), dissolved in an organic solvent and/or water, and continuing stirring until the residual epoxide equivalent weight of the reaction mixture is more than 20,000 g/equivalent.

11. A paint or coating formulation containing as a filler an aqueous dispersion of cross-linked polymer microparticles of claim 1.

12. A formulation of claim 11 which is an aqueous cataphoresis electrodeposition coating with an aqueous two component epoxide/amine binder system.

* * * * *